United States Patent
Bigaj et al.

(10) Patent No.: US 11,748,638 B2
(45) Date of Patent: Sep. 5, 2023

(54) MACHINE LEARNING MODEL MONITORING

(71) Applicant: International Business Machines Corporation, Armonk, NY (US)

(72) Inventors: Rafal Bigaj, Cracow (PL); Lukasz G. Cmielowski, Cracow (PL); Wojciech Sobala, Cracow (PL); Maksymilian Erazmus, Zasów (PL)

(73) Assignee: International Business Machines Corporation, Armonk, NY (US)

(*) Notice: Subject to any disclaimer, the term of this patent is extended or adjusted under 35 U.S.C. 154(b) by 578 days.

(21) Appl. No.: 16/935,670

(22) Filed: Jul. 22, 2020

(65) Prior Publication Data

US 2022/0027749 A1    Jan. 27, 2022

(51) Int. Cl.
*G06N 5/04*    (2023.01)
*G06N 20/00*    (2019.01)

(52) U.S. Cl.
CPC ............ *G06N 5/04* (2013.01); *G06N 20/00* (2019.01)

(58) Field of Classification Search
CPC .......... G06N 5/04; G06N 5/003; G06N 20/00; G06N 20/10; G06N 3/0445; G06N 3/0454
See application file for complete search history.

(56) References Cited

U.S. PATENT DOCUMENTS

| | | | |
|---|---|---|---|
| 2015/0030238 A1* | 1/2015 | Yang | G06V 10/50 |
| | | | 382/197 |
| 2017/0053223 A1 | 2/2017 | Kothari | |
| 2017/0372232 A1* | 12/2017 | Maughan | G06F 3/0482 |
| 2019/0197244 A1 | 6/2019 | Fong | |
| 2019/0205643 A1* | 7/2019 | Liu | G06N 3/04 |
| 2020/0034665 A1* | 1/2020 | Ghanta | G06N 20/00 |
| 2020/0285649 A1* | 9/2020 | Jalalibarsari | H04L 67/565 |
| 2021/0073627 A1* | 3/2021 | Sarferaz | G06N 20/00 |

OTHER PUBLICATIONS

"1.12. Multiclass and multioutput algorithms" 1.12. scikit-learn user guide, 2007. (Year: 2007).*
"1.12. Multiclass and multilabel algorithms," scikit-learn, accessed May 26, 2020, 7 pages <https://scikit-learn.org/stable/modules/multiclass.html#multioutput-classification>.
Anonymous, "Automated System for Defect Verification," IP.com, Disclosure No. IPCOM000261511D, Mar. 11, 2020, 4 pages. <https://ip.com/IPCOM/000261511>.
Anonymous, "System for Simulating Variety of Machine Learning Models Based on Custom Machine Learning Engine," IP.com, Disclosure No. IPCOM000259198D, Jul. 19, 2019, 4 pages. <https://ip.com/IPCOM/000259198>.

* cited by examiner

*Primary Examiner* — Dave Misir
(74) *Attorney, Agent, or Firm* — Mark Bergner

(57) ABSTRACT

A dataset is received that is for processing by a machine learning model. A scoring payload for the dataset and that regards the machine learning model is also received. A set of features of the machine learning model is determined by analyzing the scoring payload. The scoring payload is structured in accordance with the set of features such that the structured scoring payload is ready for analysis for a monitor of the machine learning model.

16 Claims, 3 Drawing Sheets

MACHINE LEARNING MODEL MONITORING

BACKGROUND

Modern computing solutions often utilize one or more artificial intelligence (AI) solutions in processing data. These AI solutions may be configured to learn by updating an algorithm of the AI system over time via one or more machine learning techniques. In some examples, a modern computing solution may use a plurality of different models that each are configured to receive different kinds of input data and therein output results that are responsive to (or provide more useful versions of) the input data. These models may analyze their own utilization to identify correlations and/or associations and therein incrementally update steps, thresholds, calculations, or the like. In this way, models of such AI solutions may increase the utility (e.g., the accuracy, reliability, knowledgebase, or the like) of the computing solution.

However, these ongoing changes may also increase the number of ways in which the system may become miscalibrated over time should the models "learn" incorrect information. Toward that end, systems may utilize monitors that monitor how models change over time. In some examples, computer systems may include a plurality of monitors to better verify whether or not the AI system is becoming miscalibrated over time, such that each monitor may be configured to detect one or more different ways in which one or more models may suboptimally operate and/or update itself.

SUMMARY

Aspects of the present disclosure relate to a computer-implemented method, system, and computer program product relating to detecting features of a machine learning model from a scoring payload of the machine learning model. For example, the method includes receiving a dataset for processing by a machine learning model. The method also includes receiving a scoring payload for the dataset that regards the machine learning model. The method also includes determining a set of features of the machine learning model by analyzing the scoring payload. The method also includes structuring the scoring payload in accordance with the set of features such that the structured scoring payload is ready for analysis for a monitor of the machine learning model. The system and computer program product may be configured to execute steps that are substantially similar to this computer-implemented method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
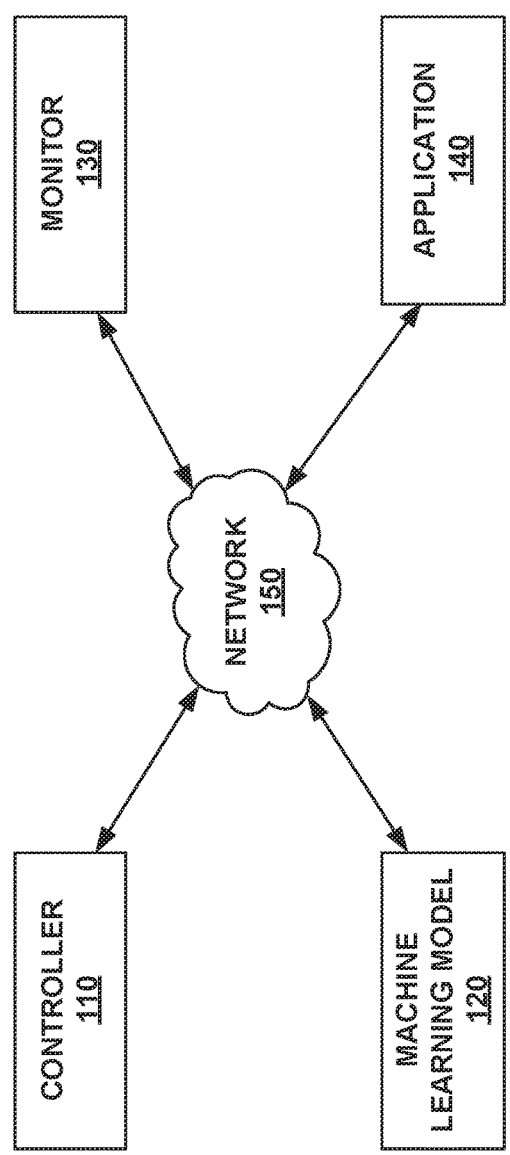
FIG. 1 depicts a conceptual diagram of an example system in which a controller may detect properties of a machine learning model for structuring data for a monitor of the model.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to setting up and providing data to monitors for machine learning models, while more particular aspects of the present disclosure relate to using a payload of a model to detect properties of machine learning models for autonomously monitoring these models, therein compensating for an environment of the model. While the present disclosure is not necessarily limited to such applications, various aspects of the disclosure may be appreciated through a discussion of various examples using this context.

Conventional computing applications often make use of artificial intelligence (AI) systems that themselves utilize one or more machine learning models. A machine learning model may be configured to analyze data of the computing application via one or more machine learning techniques. For example, a computing application may be configured to execute one or more functions, and the machine learning model may manage and/or select the data that is used to execute these functions. In some examples, a machine learning model may additionally or alternatively be used to execute the functions themselves. Given the increasing capabilities of machine learning models, the use of these machine learning models often increases the performance and functionality of applications that utilize them.

Given the extent that machine learning models have within computing applications to manipulate how data is processed and output, conventional computing applications often utilize monitors that monitor these machine learning models during operation. These monitors may be configured to detect if a machine learning model is operating in a suboptimal way, potentially as a result of the model "learning" and/or reinforcing suboptimal rules. Further, machine learning models are often "trained" on 10% or less of the data that the machine learning models will thereafter be processing, such that often an initial configuration may include unrealized errors in an algorithm of the machine learning models that causes suboptimal results when the machine learning model goes into production (e.g., where production is a "live" computing environment where results of the machine learning models are provided to customers). Such initial configuration errors and/or suboptimal algorithms may be present in addition to, or as an alternative of, a learned rule or configuration created by a machine learning model.

For example, conventional monitors may include bias detection monitors that detect whether a machine learning model processes some datasets in a way that does not reflect accurate data and/or true correlations (e.g., such that the machine learning model has a bias either for or against some portions of this data and/or some determinations that are related to this data). For another example, conventional monitors may include drift detection monitors that detect a change in one or more relationships between input data and output data over time. Conventional systems may have these and many other monitors that work independently and/or together to track and analyze the algorithms and performance of models over time. In some examples, a conventional system may include a plurality of monitors that provide data on the performance of a model to determine a "healthiness" of this model (e.g., where a healthiness of a machine learning model relates to an accuracy, repeatability, and/or reliability with which the machine learning model characterizes and/or utilizes data).

In order to effectively monitor a machine learning model for a given computing application, monitors must be configured for the given machine learning model, and subsequently receive tailored utilization data on the models. Each batch of the tailored utilization data may need a plurality of data points that are specific (and may be unique) to that machine learning model and the goals of the monitor. Put differently, monitors must be uniquely configured for the specific machine learning model that the monitor is to observe, and must therein receive utilization data on the machine learning models that is uniquely tailored (to how the monitors were previously uniquely configured) and is specifically configured (to provide data of the model that is being monitored). For example, a monitor may require configuration and utilization data that accounts for a service provider of the machine learning model (e.g., an organization that created and/or maintains the machine learning model), a framework of the machine learning model (e.g., scikit-learn, XGBoost, Keras), a problem type that the machine learning model looks to address (e.g., executing regression analysis, classifying data, etc.), a form in which a probability vector will be output (e.g., where the machine learning model is classifying data), the manner in which the machine learning model provides a result (e.g., whether a prediction result of an encoded target or a decoded target), or the like.

Without being initially configured for the respective machine learning model and then sent utilization data that is tailored for this configuration, it may be difficult or impossible for monitors to effectively monitor the models. For example, each monitor may need to be sent a specific set of data points that are particular to that exact monitor. A monitor may be unable to properly monitor the model if the monitor receives incorrect information, too little information, and potentially even too much information. For example, if a monitor requires utilization data on features A, B, and C, the monitor may encounter technical difficulties monitoring the model if the monitor receives utilization data on features A, B, and D (incorrect information), A and B (too little information), or utilization data on features A, B, C, and D (too much information).

Further, in addition to needing a specific set of information, in some examples, monitors may require that the utilization data be constructed (e.g., saved and transmitted) in a particular predetermined format. For example, a machine learning model from a first service provider may require that a respective monitor receive utilization data sent in a first format, while a machine learning model from a second service provider may require that a respective monitor receive utilization data sent in a second format. If the model is provided by the first service provider and the monitor receives utilization data in the second format, the monitor may have difficulty (or be completely unable to) using the utilization data in the received format, and/or if used any analysis of the monitor based on this utilization data may be faulty or garbled.

This may mean that, even upon identifying all of the features of a machine learning model and gathering all required utilization data for the machine learning model, an operator may still need to specifically structure this data in a predetermined particular format so that each monitor is able to ingest this data. The act of structuring this data for the respective monitors may therefore be both a time-intensive and error-prone process. Further, as would be understood by one of ordinary skill in the art, if this act of configuring data for monitors is done incorrectly (such that a monitor does not receive all utilization data in the predetermined format), such a failure may have far-reaching consequences as monitors may fail to identify that the model is becoming and/or has been unhealthy in its performance, leaving these models to therein damage the performance of the computing application in which they operate.

Toward this end, some conventional systems try to automate some of the process of gathering this utilization data. For example, some conventional computing systems may include a process of gathering utilization data whereby a user or module of a system can request a "score" for the machine leaning model via a "scoring request," in response to which a "scoring payload" is acquired. This scoring payload may include some or all of this utilization data. For example, the scoring payload may include input data for and/or output data from the machine learning model. For example, the scoring payload may include data that was sent to the machine learning model for processing and output data that was provided by the machine learning model.

However, conventional scoring payloads may be received in unstructured or semi-structured format that is inappropriate for upload to monitors. Put differently, utilization data as received from a conventional scoring payload may not be in the predetermined format required by monitors to properly monitor respective models. For example, a scoring payload may substantially or exclusively include a series of data points as stored in a JavaScript Object Notation (JSON) or Comma Separated Value (CSV) format, while a monitor may not be capable of processing this semi-structured input data. As such, while a scoring payload may reduce an amount of time needed to gather the utilization data, a conventional process may still require a trained human operator to manually analyze the automatically gathered scoring payload to create an input for the monitor in a fully structured form. Put differently, though these scoring payloads are a good source for the raw utilization data from which a skilled user may create input for the monitors, the process of configuring monitors and providing fully structured utilization data from conventional scoring payloads is a time-and-labor-intensive process that is prone to user error.

Some conventional systems seek to solve this problem by changing how a machine learning model outputs data, such that a scoring payload that includes this output will be configured for immediate upload to a conventional monitor. However, configuring the machine learning model for the purpose of ensuring that the output is formatted for such immediate upload runs the risk of negatively impacting the machine learning model itself. For example, machine learning models may be precisely calibrated algorithms, where changing a single factor may have a butterfly effect on the performance of the full algorithm. Such an effect may impact both the model that is being changed and also neighboring models (hence why monitors are so advantageous in the first place). As such, modifications to machine learning models that are not made based for purposes of improving the algorithm itself may be risky and disadvantageous for myriad reasons.

Aspects of this disclosure may solve or otherwise address some or all of these problems of conventional systems. For example, aspects of this disclosure are configured to analyze autonomously gathered scoring payloads such that these scoring payloads may be converted to a fully structured format that may be used to configure and supply regular utilization data to monitor. A computing device that includes a processing unit executing instructions stored on a memory may provide the functionality that addresses these problems, this computing device herein referred to as a controller. The controller may be provided by a standalone computing device as predominantly described below for purposes of clarity, though in other examples the controller may be integrated into the monitoring platform, into the AI platform that includes the machine learning models, or into any other computer system of the computer environment described below while still providing the functionality described herein.

The controller may determine these features of the unstructured or semi-structured scoring payload via one or more techniques, such as via a multioutput multiclass classification technique. A multioutput multiclass classification technique may combine the use of multiclass classification, multilabel classification, and/or multioutput regression classification. For example, multiclass classification assigns an entity into one of two or more classes (e.g., such that each entity is assigned to a single class), multilabel classification assigns an entity with one or more labels that are not mutually exclusive, and multioutput regression classification assigns an entity with one or more weighted variables, such that a multioutput multiclass classification technique may utilize all three of these classification techniques. The output from a multioutput multiclass classification technique may be in any number of formats, such as in a 2D numpy array or sparse matrix. Regardless of the output, the controller may be configured to use the multioutput multiclass classification technique to determine features such as learning framework, service provider, problem type, and whether a result of the scoring payload is an encoded target or a decoded target.

Further, in some examples the controller may be configured to analyze correlations between a predicted output of the input of a scoring payload and the actual output of the scoring payload to determine features of the machine learning model. For example, the controller may analyze correlations between various values within certain columns to determine features of the scoring payload (e.g., where the column titles themselves are not useful in determining such features or correlations). Put differently, the controller may be configured to utilize and/or identify features of the machine learning model by the format in which columns of data are output.

In some examples, a controller may be able to identify some or all features required to provide utilization data to a monitor (so that the monitor can fully monitor a machine learning model) by directly identifying values from a scoring payload as features to be specifically structured for a monitor. In other examples, the only way to identify some features required for a monitor (e.g., required to determine the healthiness of a machine learning model) may be by determining these features via correlations between values of the scoring payload as described above. For example, models from some service providers may result in scoring payloads that do not include probability vectors. As such, the controller may create probability fields based on the correlation analysis between, e.g., the predicted target (one hot encoded) and the probability fields (e.g., that keep probability scores for each of the determined class separately).

For example, FIG. 1 depicts environment 100 in which controller 110 manages how machine learning model 120 is monitored by monitor 130 as the machine learning model operates for computer application 140. Though a single machine learning model 120, monitor 130, and application 140 is depicted in FIG. 1 for purposes of illustration, in other examples a plurality of monitors 130 may monitor each of a plurality of machine learning models 120 that execute functionality of one or a plurality of applications 140.

Figure 2:
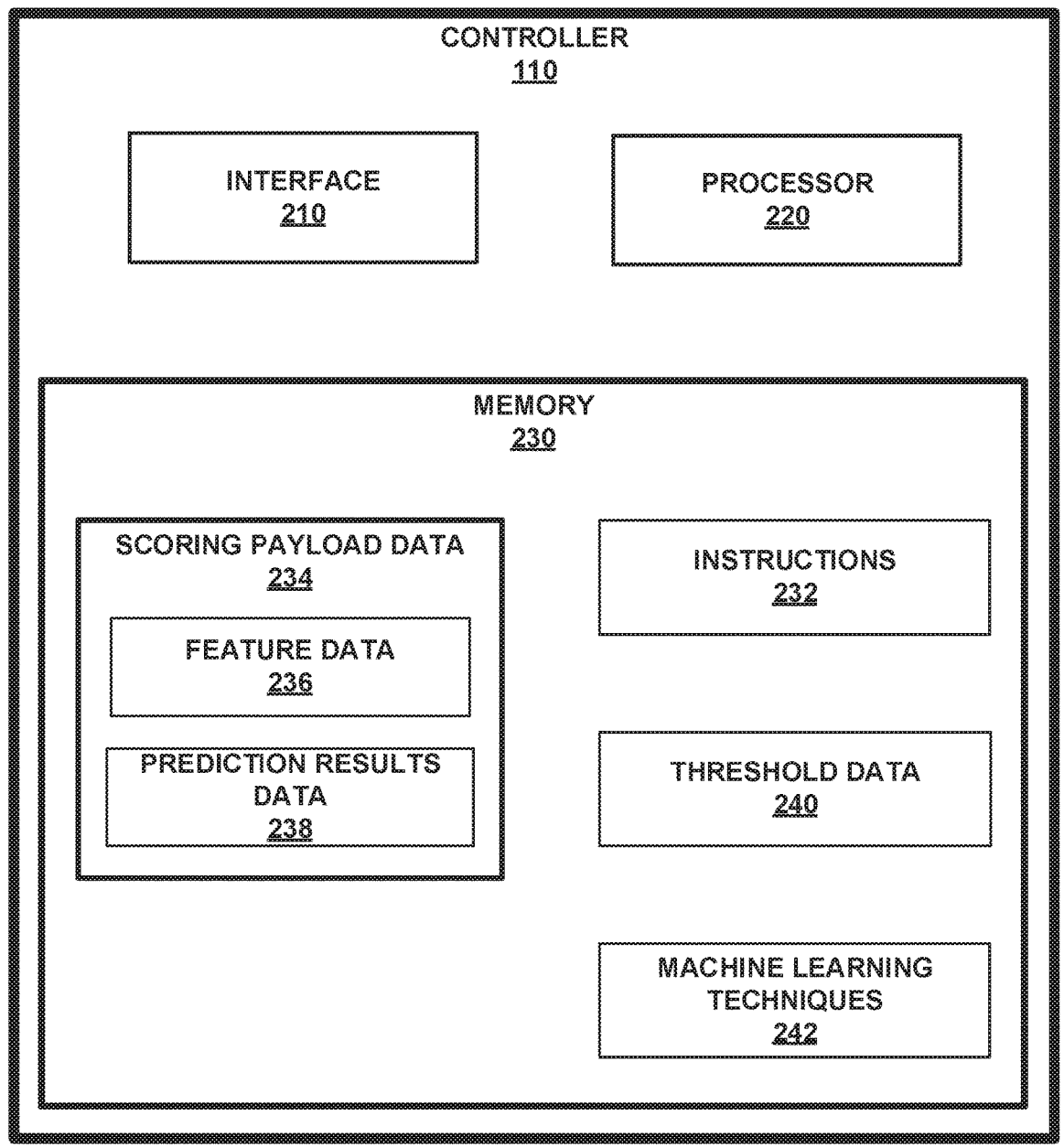
FIG. 2 depicts a conceptual box diagram of example components of the controller of FIG. 1.

Controller 110 may include and/or be part of a computing device, such as computing system 200 of FIG. 2 that includes a processor communicatively coupled to a memory that includes instructions that, when executed by the processor, causes controller 110 to execute one or more operations described below. As depicted in FIG. 1, each of controller 110, machine learning model 120, monitor 130, and/or application 140 may be separate devices that communicate over network 150. In other examples, two or more of controller 110, machine learning model 120, monitor 130, and/or application 140 may be modules and/or components within a single computing device. For example, machine learning model 120 may be hosted on a server that also hosts application 140, and controller 110 may be hosted on a server that also hosts monitor 130, or the like.

Network 150 may include a computing network over which computing messages may be sent and/or received. For example, network 150 may include the Internet, a local area network (LAN), a wide area network (WAN), a wireless network such as a wireless LAN (WLAN), or the like. Network 150 may comprise copper transmission cables, optical transmission fibers, wireless transmission, routers, firewalls, switches, gateway computers and/or edge servers. A network adapter card or network interface in each computing/processing device (e.g., each computer or hosting server that hosts one or more of controller 110, machine learning model 120, monitor 130, and/or application 140) may receive messages and/or instructions from and/or through network 150 and forward the messages and/or instructions for storage or execution or the like to a respective memory or processor of the respective computing/processing device. Though network 150 is depicted as a single entity in FIG. 1 for purposes of illustration, in other examples network 150 may include a plurality of private and/or public networks over which controller 110 may manage connectivity as described herein.

As described above, machine learning model 120 may analyze input data and provide output data for application 140. For example, application 140 may be a customer-facing software application that provides software-as-a-service (SaaS) functionality over network 150, and machine learning model 120 may enable application 140 to provide some of this functionality. Machine learning model 120 may learn how to improve at providing this functionality over time via one or more machine learning techniques, such as those techniques described herein.

Monitor 130 may require utilization data in order to monitor machine learning model 120. As discussed above, the utilization data as sent to monitor 130 must include specific and predetermined datapoints based on features of machine learning model 120 and based on what functionality of machine learning model 120 that monitor 130 will monitor. Toward that end, controller 110 may gather a scoring payload that includes some or all of this utilization data. For example, the scoring payload may include input data that is sent by application 140 to machine learning model 120 for processing, as well as output data as processed by machine learning model 120 with the input data. Controller 110 may send the input data to machine learning model 120 to generate the scoring payload, or controller 110 may cause another component of environment 100 (e.g., application 140, or monitor 130) to send the input data to generate the scoring payload.

Controller 110 may then determine features of machine learning model 120. Controller 110 may determine these features by analyzing the scoring payload. Controller 110 may determine those features of machine learning model 120 that are required for monitor 130 to effectively (e.g., reliably and repeatably) monitor machine learning model 120. In some examples, controller 110 may only determine those features of machine learning model 120 that are required by monitor 130. For example, controller 110 may determine such features as a service provider of machine learning model 120, a framework of machine learning model 120, a problem type that monitor 130 is monitoring for, output fields that relate to a prediction or probability determined by machine learning model 120, or the like.

Controller 110 may also determine the prediction results from the scoring payload. As used herein, prediction results may include a set of results that monitor 130 expects machine learning model 120 to generate from the input data. Controller 110 may generate prediction results from scoring payload in different forms based on the functionality and algorithm of the respective machine learning model 120. For example, where controller 110 determines that monitor 130 is a classification monitor, controller 110 may generate prediction results in the form of a probability vector. Controller 110 may generate this probability vector in the form of an array, such that this array is indexed consistently with a label order defined by the scoring payload.

For example, the scoring payload may include an unstructured collection of data points that include: a count of features in the scoring request; a name of the field for each of the features; a format of the scoring request (e.g., JSON, CSV); a format of the scoring request (e.g., dictionary or list); a name of the field that includes the results; a number of output fields in the results; names for each respective output field; types of each respective output field (e.g., numeric, string, array), or the like. The scoring payload may include such data in substantially any order depending upon which machine learning models 120 are being scored. Controller 110 may analyze one or more scoring payloads from respective machine learning models 120 to determine which field is which, and therein to determine features and prediction results. For example, controller 110 may utilize various machine learning features to learn how to determine which field is which, and therein to determine parameters and prediction results. In some examples, controller 110 utilizes a multioutput multiclass classification technique to analyze the scoring payload to determine features and/or the prediction results.

Once determined, controller 110 may convert these features into a structured file that may be uploaded to monitor 130. Controller 110 may consult one or more frameworks that specify how different types of monitors 130 require that utilization data is structured. For example, controller 110 may consult a local or remote repository that specifies the specific predetermined structure in which each monitor 130 requires utilization data, and, upon thusly gathering utilization data, structure it accordingly.

Monitor 130 may be able to analyze the data as sent by controller 110 to analyze machine learning model 120. Monitor 130 may analyze the data sent by controller 110 as determined by analyzing the scoring payload without a human structuring the data due to the structured format utilized by controller 110.

Monitor 130 may determine whether or not machine learning model 120 is operating as expected. For example, monitor 130 may determine whether or not machine learning model 120 is drifting or exhibiting a bias that is greater than a threshold amount, or the like. If monitor 130 determines that machine learning model 120 is performing in a manner that fails a threshold, the monitor may generate an alert relating to machine learning model 120. For example, monitor 130 may generate an alert that includes an email, pop-up window, text notification, or the like for one or more administrators that are responsible for application 140. In some examples, controller 110 may generate and/or transmit this alert in response to monitor 130 determining that machine learning model 120 is performing in a way that fails one or more threshold.

Controller 110 may include or be part of a computing device that includes a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interface 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with a device that is hosting application 140, machine learning model 120, monitor 130, or the like. Interface 210 may include one or more network interface cards, such as Ethernet cards and/or any other types of interface devices that can send and receive information. Any suitable number of interfaces may be used to perform the described functions according to particular needs.

As discussed herein, controller 110 may be configured to detect features of a machine learning model to structure utilization data for a monitor. Controller 110 may utilize processor 220 to thusly detect features of a machine learning model. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to detect features of a machine learning model from a scoring payload of the machine learning model.

Processor 220 may detect features of a machine learning model from a scoring payload according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may detect features of machine learning models as described herein according to instructions 232 of one or more applications (e.g., software applications) stored in memory 230 of controller 110.

In addition to instructions 232, in some examples gathered or predetermined data or techniques or the like as used by processor 220 to detect features of machine learning models as described herein may be stored within memory 230. For example, memory 230 may include information described above that is gathered from machine learning model 120 and/or application 140. For example, as depicted in FIG. 2, memory 230 may include scoring payload data 234. Scoring payload data 234 may include feature data 236 and/or prediction results data 238.

Further, memory 230 may include threshold data 240. Threshold data 240 may include thresholds that define what constitutes machine learning model 120 performing in an acceptable manner. For example, threshold data 240 may detail a point at which monitor 130 determines that machine learning model 120 is drifting and/or has exhibited a bias.

Memory 230 may further include machine learning techniques 242 that controller 110 may use to improve a process of detecting features of machine learning model 120 by analyzing the scoring payload of machine learning model 120 as discussed herein over time. Machine learning techniques 242 can comprise algorithms or models that are generated by performing supervised, unsupervised, or semi-supervised training on a dataset, and subsequently applying the generated algorithm or model to detect features of machine learning model 120. Using these machine learning techniques 242, controller 110 may improve an ability of detecting features of machine learning model 120 over time. For example, controller 110 may detect improved correlations for determining a probability vector for one or more machine learning models 120 as described above.

Machine learning techniques 242 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Specifically, machine learning techniques 244 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 3:
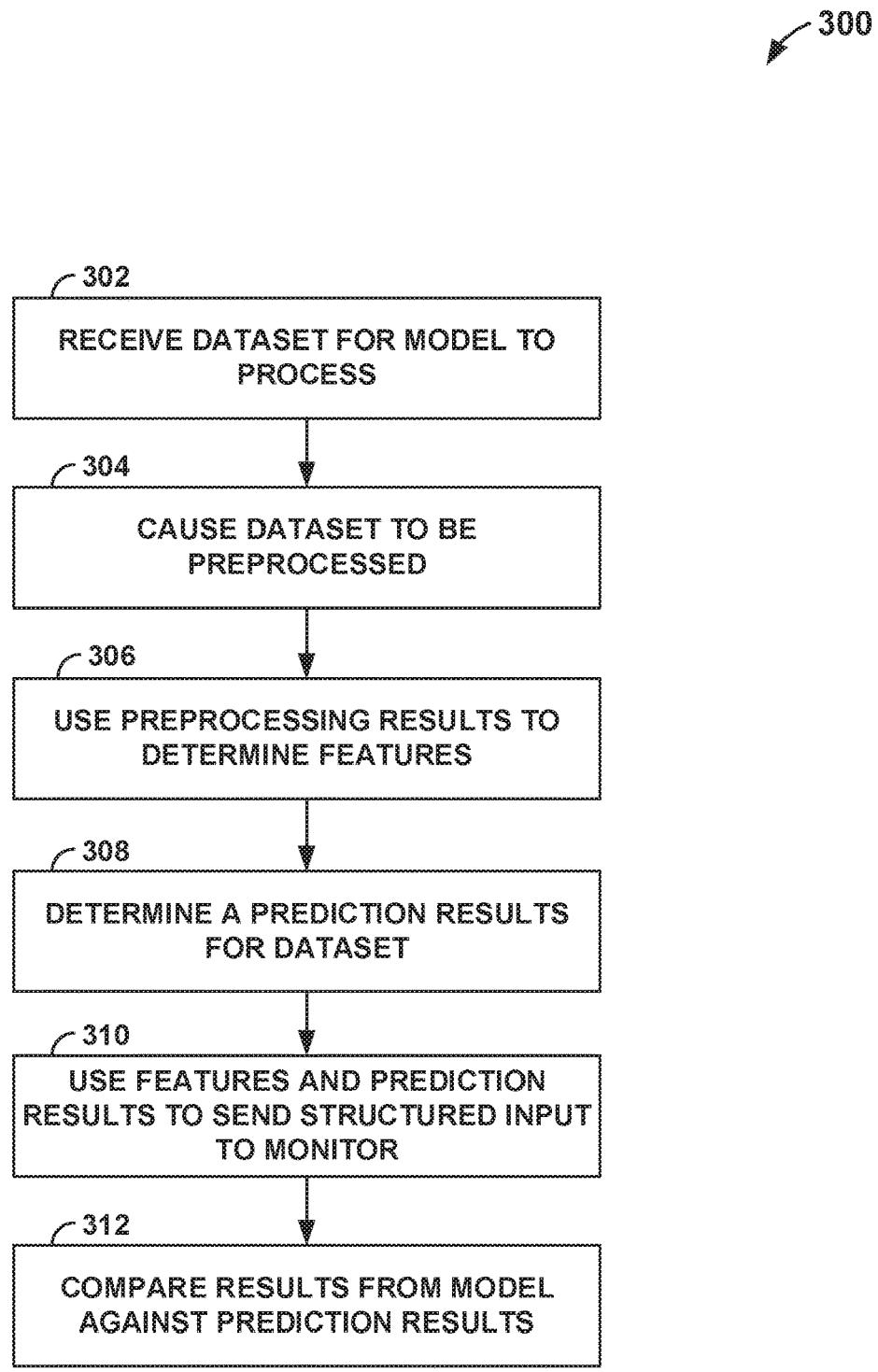
FIG. 3 depicts an example flowchart by which the controller of FIG. 1 may detect properties of a machine learning model for structuring data for a monitor of the model.

Using these components, controller 110 may detect features of machine learning model 120 using scoring payloads of machine learning model 120 for monitor 130 as discussed herein. For example, controller 110 may determine features of machine learning model 120 according to flowchart 300 depicted in FIG. 3. Flowchart 300 of FIG. 3 is discussed with relation to FIG. 1 for purposes of illustration, though it is to be understood that other systems may be used to execute flowchart 300 of FIG. 3 in other examples. Further, in some examples controller 110 may execute a different method than flowchart 300 of FIG. 3, or controller 110 may execute a similar method with more or less steps in a different order, or the like.

For example, controller 110 may receive a dataset that is to be processed by machine learning model 120 (302). Controller 110 may receive the dataset from machine learning model 120 itself, from application 140, or from another source. This dataset may include data that machine learning model 120 is to process as part of standard operation (e.g., as part of processing data and/or providing functionality within application 140). Additionally, and/or alternatively, the dataset may be data that is structured to test machine learning model 120. Put differently, in some examples some datasets with which monitor 130 is to monitor machine learning model 120 as described herein may be specifically structured for monitoring rather than "production" datasets received as part of normal operation of machine learning model 120.

Controller 110 may cause the received dataset to be preprocessed (304). For example, controller 110 may send a scoring request regarding the received dataset. Controller 110 may send this scoring request to any element of environment 110 that executes the scoring request. Controller 110 may receive the scoring payload as described herein such that the dataset is preprocessed.

The scoring payload may include various types of information depending upon environment 100. For example, the scoring payload may include results from machine learning model 120. Machine learning model 120 may process the dataset to determine these results in response to receiving the scoring request, and/or machine learning model 120 may process the dataset to determine the results according to normal operations as part of application 140 (e.g., such that controller 110 or another agent of environment 100 captures these results as they are sent from machine learning model 120 to application 140).

Controller 110 may use preprocessing results to determine a set of features (306). The set of features may include features of machine learning model 120 as described herein, such as a service provider or the like of machine learning model 120. Additionally, or alternatively, the set of features of monitor 130 such as a functionality of machine learning model 120 that monitor 130 is monitoring.

Controller 110 may determine prediction results for the dataset as preprocessed (308). For example, controller 110 may determine prediction results from this scoring payload. Put differently, even where the scoring payload includes the actual results from machine learning model 120, controller 110 may additionally identify and/or generate predicted results from other fields from scoring payload so that monitor 130 may determine a healthiness of machine learning model 120.

In some examples, controller 110 may merely stitch together prediction results from gathering different datapoints of scoring payload. In other examples, controller 110 may have to generate prediction results. For example, where monitor 130 requires probability vectors as described herein, controller 110 may analyze correlations between the received dataset and the scoring payload to determine these probability vectors.

Controller 110 may use these features and the determined prediction results to send a structured input to monitor 130 (310). In some examples, controller 110 may send a structured input of the prediction results to monitor 130, where the structured input of the prediction results is structured according to the determined set of features. Monitor 130 may receive a set of actual result of machine learning model 120. As discussed above, these actual results may be received via scoring payload, though other manners by which monitor 130 receives the actual results are possible in other examples. Monitor 130 may compare these actual results as determined by machine learning model 120 with the prediction results (312). Based on these comparisons, monitor 130 may determine a healthiness of machine learning model 120. For example, if monitor 130 determines that machine learning model 120 is exhibiting less than a threshold amount of bias and less than a threshold amount of drift by comparing a difference between the predicted results and the actual results, monitor 130 may determine that machine learning model 120 is healthy. In some examples, rather than a binary healthy/unhealthy determination, monitor 130 may determine a healthiness grade (e.g., between 1 and 100) depending upon the comparison between the predicted results and the actual results.

In some examples, monitor 130 may send an alert and/or report to a user or to a repository regarding a healthiness of machine learning model 120. For example, controller 110 may cause monitor 130 to send an alert to a user if a calculated healthiness of machine learning model 120 falls below a threshold due to a gap between machine learning model 120 results and the predicted results being larger than a threshold amount. Controller 110 may cause this alert to be sent to location accessible via network 150 (e.g., to a cell phone of a user, or to an email address, or the like).

For example, contained below are samples of pseudo code (e.g., labelled lines that reflect logic of code) that relate to various aspects of this disclosure. For example, an array may include example scoring payloads that are related to different service providers with various fields that relate to results and/or features as described herein:

```
sample_responses = [
    {
        "labels": {
            "framework": "sklearn",
            "service_provider": "watson_machine_learning",
            "problem_type": "multiclass",
            "probability_field_name": "probability",
            "prediction_field_name": "prediction"
        },
        "scoring_request": {
            "feature_count": 11,
            "request_type": "JSON",
            "feature_field_name": "values",
            "request_format": "list"
        },
        "scoring_response": {
            "predictions": {
                "fields": [
                    "prediction",
                    "probability" ],
                "values": [
                    [
                        5,
                        [
                            0.0020795646123588085,
                            0.04098806157708168,
                            0.7461642622947693,
                            0.19922421872615814,
                            0.010645766742527485,
                            0.0008980887942016125
                        ]
                    ],
                    [
                        5,
                        [
                            0.020223524421453476,
                            0.009667330421507359,
                            0.755413293838501,
                            0.20852884650230408,
                            0.005367044825106859,
                            0.0007999259978532791
```

```
            ]
          ]
        }
      }
    },
    {
      "labels": {
        "framework": "xgboost",
        "service_provider": "watson_machine_learning",
        "problem_type": "multiclass",
        "probability_field_name": "prediction",
        "prediction_field_name": "_not_available"
      },
      "scoring_request": {
        "feature_count": 11,
        "request_type": "JSON",
        "feature_field_name": "values",
        "request_format": "list"
      },
      "scoring_response": {
        "predictions": {
          "fields": [
            "prediction",
            "probability" ],
          "values": [
            [
              [
                 0.0029579054098576307,
                 0.06865553557872772,
                 0.690179169178009,
                 0.22354955971240997,
                 0.012621846050024033,
                 0.002036000369116664
              ],
              [
                 -3.0687806606292725,
                 0.07583951950073242,
                 2.3836889266967773,
                 1.2563707828521729,
                 -1.6178333759307861,
                 -3.442275047302246
              ]
            ],
            [
              [
                 0.023148687556385994,
                 0.02111859805881977,
                 0.6901470422744751,
                 0.2553234398365021,
                 0.008676234632730484,
                 0.0015860676066949964
              ],
              [
                 -0.5567127466201782,
                 -0.6484968662261963,
                 2.8382537364959717,
                 1.8438801765441895,
                 -1.5380635261535645,
                 -3.2373931407928467
              ]
            ]
          ]
        }
      }
    },
    {
      "labels": {
        "framework": "pytorch",
        "service_provider": "sagemaker",
        "problem_type": "regression",
        "probability_field_name": "_not_available",
        "prediction_field_name": "score"
      },
      "scoring_request": {
        "feature_count": 58,
        "request_type": "CSV",
        "feature_field_name": "_not_available",
        "request_format": "list"
```

```
        },
        "scoring_response": {
            "predictions": {
                "score":
                    0.9321103096008301
            }
        }
    },
    {
        "labels": {
            "framework": "pytorch",
            "service_provider": "sagemaker",
            "problem_type": "binary",
            "probability_field_name": "score",
            "prediction_field_name": "predicted_label"
        }, "scoring_request": {
            "feature_count": 58,
            "request_type": "CSV",
            "feature_field_name": "_not_available",
            "request_format": "list"
        },
        "scoring_response": {
            "predictions": {
                "score": 0.9256330728530884,
                "predicted_label": 1.0
            }
        }
    },
    {
        "labels": {
            "framework": "azure_native",
            "service_provider": "azure",
            "problem_type": "multiclass",
            "probability_field_name": "_not_available",
            "prediction_field_name": "Scored Labels"
        },
        "scoring_request": {
            "feature_count": 5,
            "request_type": "JSON",
            "feature_field_name": "Inputs",
            "request_format": "dict"
        },
        "scoring_response": {
            "Results": {
                "AGE": "27",
                "Scored Probabilities for Class \"Outdoor Protection\"": "0",
                "Scored Probabilities for Class \"Camping Equipment\"": "0",
                "PRODUCT_LINE": "Personal Accessories",
                "Scored Labels": "Personal Accessories",
                "Scored Probabilities for Class \" Mountaineering Equipment\"":
"0",
                "Scored Probabilities for Class \" Golf Equipment\"": "0.0570687",
                "Scored Probabilities for Class \"Personal Accessories\"": "0.9429"
            }
        }
    }
]
```

As discussed herein, controller 110 may be configured to detect features of machine learning model 120 and/or monitor 130 as contained within a scoring payload and to structure input accordingly. For example, controller 110 may identify features such as what type of problem type was identified in the scoring payload, what type of service provided was identified in the scoring payload, specific values of the payload, or the like. In some examples, controller 110 may identify features of machine learning model 120 and/or monitor 130 with which to structure the input for monitor 130 based on whether data was present in the scoring payload or whether a null value was present (e.g., where a null value might be the "not_available" value provided above). For example, controller 110 may identify features of the scoring payload via pseudo code such as:

```
def is_number(s):
    try:
        float(s)
        return True
    except (TypeError, ValueError):
        return False
def is_array(s):
    return isinstance(s, list)
```

```
        def field_type(t):
            if is_number(t):
                return 'number'
            if is_array(t):
                return 'array'
        return 'string'
d
def process_scoring_response(response):
    predictions_field_name = next(iter(response))
    predictions = response[predictions_field_name]
    fields = [ ]
    if 'fields' in predictions:
        predictions_format = 'list'
        output_field_count = len(predictions['fields'])
        values = predictions['values']
        for (i, field) in enumerate(predictions['fields']):
            fields.append({
                'name': field,
                'type': field_type(values[i])
            })
    else:
        predictions_format = 'dict'
        output_field_count = len(predictions.keys( ))
        for field in predictions:
            fields.append({
                'name': field,
                'type': field_type(predictions[field])
            })
    response_data = {
        'predictions_field_name': predictions_field_name,
        'output_field_count': output_field_count
    }
    for (i, field) in enumerate(fields):
        response_data['output_field_{ }_name'.format(i)] = field['name']
        response_data['output_field_{ }_type'.format(i)] = field['type']
    return response_data
def map_sample(sample):
    return {
        'labels': sample['labels'],
        'scoring_request': sample['scoring_request'],
        'scoring_response': process_scoring_response(sample['scoring_response'])
    } [map_sample(s) for s in sample_responses]
```

Once controller 110 detects the features as described herein using such loops and algorithms as outlined above, controller 110 may generate the structured input that includes utilization data, such as predicted results, current status, and/or actual results. Controller 110 may then send this structured set of utilization data to monitor 130 so that monitor 130 may determine a healthiness of machine learning model 120.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving a dataset for processing by a machine learning model (MLM);
receiving a scoring payload comprising a set of information related to operation of the MLM using the dataset;
determining a set of features of the machine learning model by analyzing the scoring payload;
determining prediction results that are predicted to be produced by the MLM for the scoring payload by analyzing fields within the scoring payload; and
structuring the scoring payload in accordance with the set of features such that the structured scoring payload is ready for analysis for a monitor of the machine learning model, wherein the structuring utilizes a technique selected from the group consisting of a classification technique, a correlation technique, and a direct value identification technique;
wherein:
the set of features is determined by a controller that includes a second MLM that utilizes a multioutput multiclass classification technique;
the set of features comprises:
a learning framework of the machine learning model;
a service provider of the machine learning model;
a problem type for the scoring payload; and
whether a result of the scoring payload is an encoded target or a decoded target;
the method further comprising:
sending the structured scoring payload from the controller to the monitor for determining a health of the MLM.

2. The computer-implemented method of claim 1, further comprising sending the structured scoring payload to the monitor.

3. The computer-implemented method of claim 1, further comprising causing the monitor to analyze the structured scoring payload.

4. The computer-implemented method of claim 1, further comprising causing the monitor to compare the prediction results with actual results produced by the MLM from the dataset.

5. The computer-implemented method of claim 4, further comprising receiving, from the monitor, an alert regarding a performance of the machine learning model.

6. The computer-implemented method of claim 5, further comprising notifying an administrator of the alert.

7. The computer-implemented method of claim 1, further comprising determining that one of the set of features indicates that the monitor is a classification monitor.

8. The computer-implemented method of claim 7, wherein determining the prediction results includes determining a probability vector in response to determining that the one feature indicates that the monitor is a classification monitor.

9. A system comprising:
a processor; and
a memory in communication with the processor, the memory containing instructions that, when executed by the processor, cause the processor to:
receive a dataset for processing by a machine learning model (MLM);
receive a scoring payload comprising a set of information related to operation of the MLM using the dataset;
determine a set of features of the machine learning model by analyzing the scoring payload;
determine prediction results that are predicted to be produced by the MLM for the scoring payload by analyzing fields within the scoring payload; and
structure the scoring payload in accordance with the set of features such that the structured scoring payload is ready for analysis for a monitor of the machine learning model, wherein the structuring utilizes a technique selected from the group consisting of a classification technique, a correlation technique, and a direct value identification technique;
wherein:
the set of features is determined by a controller that includes a second MLM that utilizes a multioutput multiclass classification technique;
the set of features comprises:
a learning framework of the machine learning model;
a service provider of the machine learning model;
a problem type for the scoring payload; and
whether a result of the scoring payload is an encoded target or a decoded target
the controller is further configured to send the structured scoring payload to the monitor for determining a health of the MLM.

10. The system of claim 9, the memory containing additional instructions that, when executed by the processor, cause the processor to send the structured scoring payload to the monitor.

11. The system of claim 9, the memory containing additional instructions that, when executed by the processor, cause the processor to:
cause the monitor to analyze the structured scoring payload by comparing the prediction results with actual results produced by the MLM from the dataset; and
receive, from the monitor, an alert regarding a performance of the machine learning model.

12. The system of claim 11, the memory containing additional instructions that, when executed by the processor, cause the processor to notify an administrator of the alert.

13. The system of claim 9, the memory containing additional instructions that, when executed by the processor, cause the processor to determine that one of the set of features indicates that the monitor is a classification monitor.

14. The system of claim 13, wherein determining the prediction results includes determining a probability vector in response to determining that the one feature indicates that the monitor is a classification monitor.

15. A computer program product, the computer program product comprising a computer readable storage medium having program instructions embodied therewith, the program instructions executable by a computer to cause the computer to:
receive a dataset for processing by a machine learning model (MLM);
receive a scoring payload comprising a set of information related to operation of the MLM using the dataset;
determine a set of features of the machine learning model by analyzing the scoring payload;
determine prediction results that are predicted to be produced by the MLM for the scoring payload by analyzing fields within the scoring payload; and
structure the scoring payload in accordance with the set of features such that the structured scoring payload is ready for analysis for a monitor of the MLM that detects how the MLM is operating based on inputs and outputs of the MLM, wherein the structuring utilizes a technique selected from the group consisting of a classification technique, a correlation technique, and a direct value identification technique;
wherein:
the set of features is determined by a controller that includes a second MLM that utilizes a multioutput multiclass classification technique;
the set of features comprises:
a learning framework of the machine learning model;
a service provider of the machine learning model;
a problem type for the scoring payload; and
whether a result of the scoring payload is an encoded target or a decoded target;
the program instructions further cause the controller to send the structured scoring payload to the monitor for determining a health of the MLM.

16. The computer program product of claim 15, the memory containing additional instructions that, when executed by the processor, cause the processor to:
send the structured scoring payload to the monitor;
cause the monitor to analyze the structured scoring payload by comparing the prediction results with actual results produced by the MLM from the dataset;
receive, from the monitor, an alert regarding a performance of the machine learning model; and
notify an administrator of the alert.

* * * * *